June 1, 1954  E. ROLF ET AL  2,679,793
FIELD CULTIVATOR
Filed Nov. 4, 1949  5 Sheets-Sheet 4

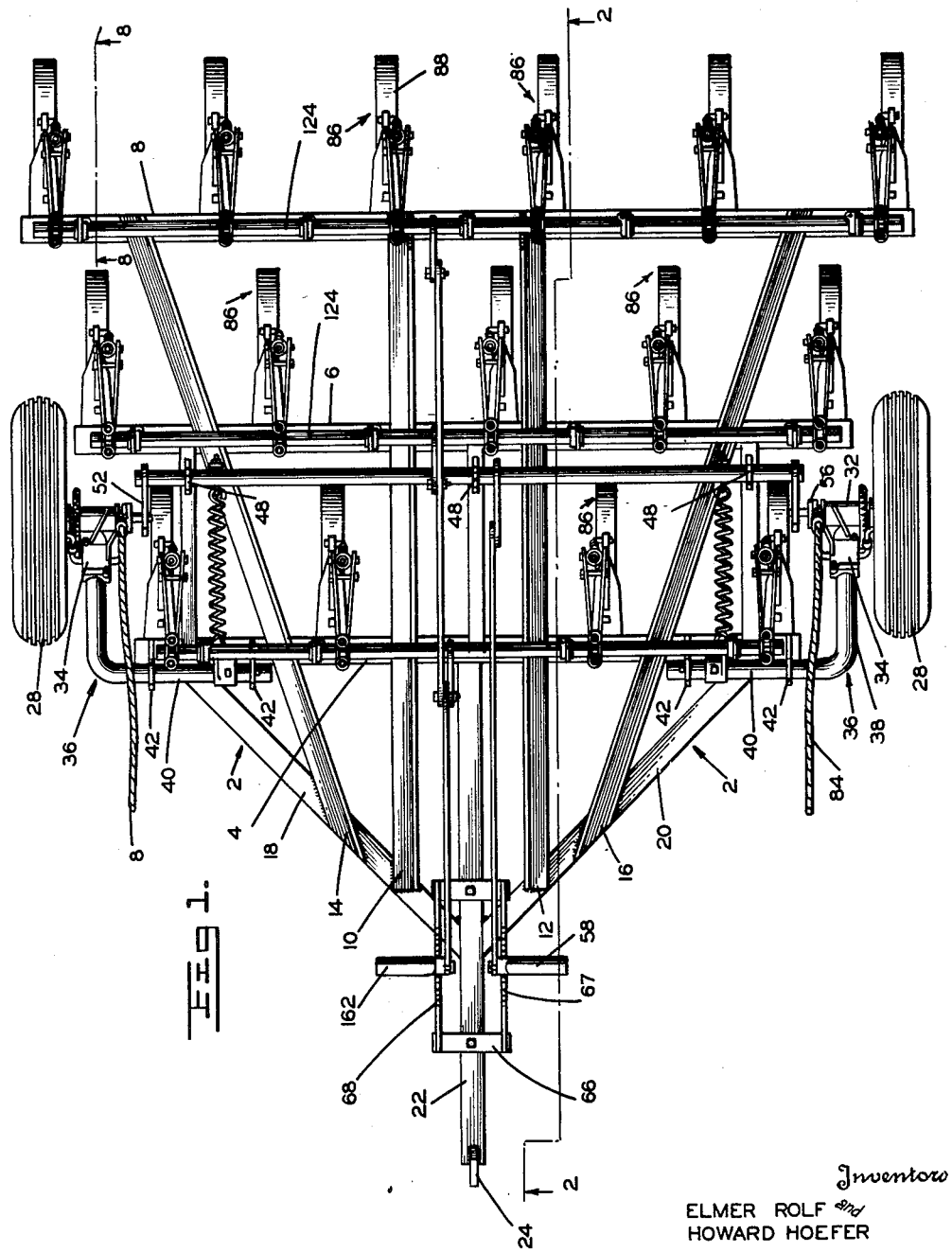

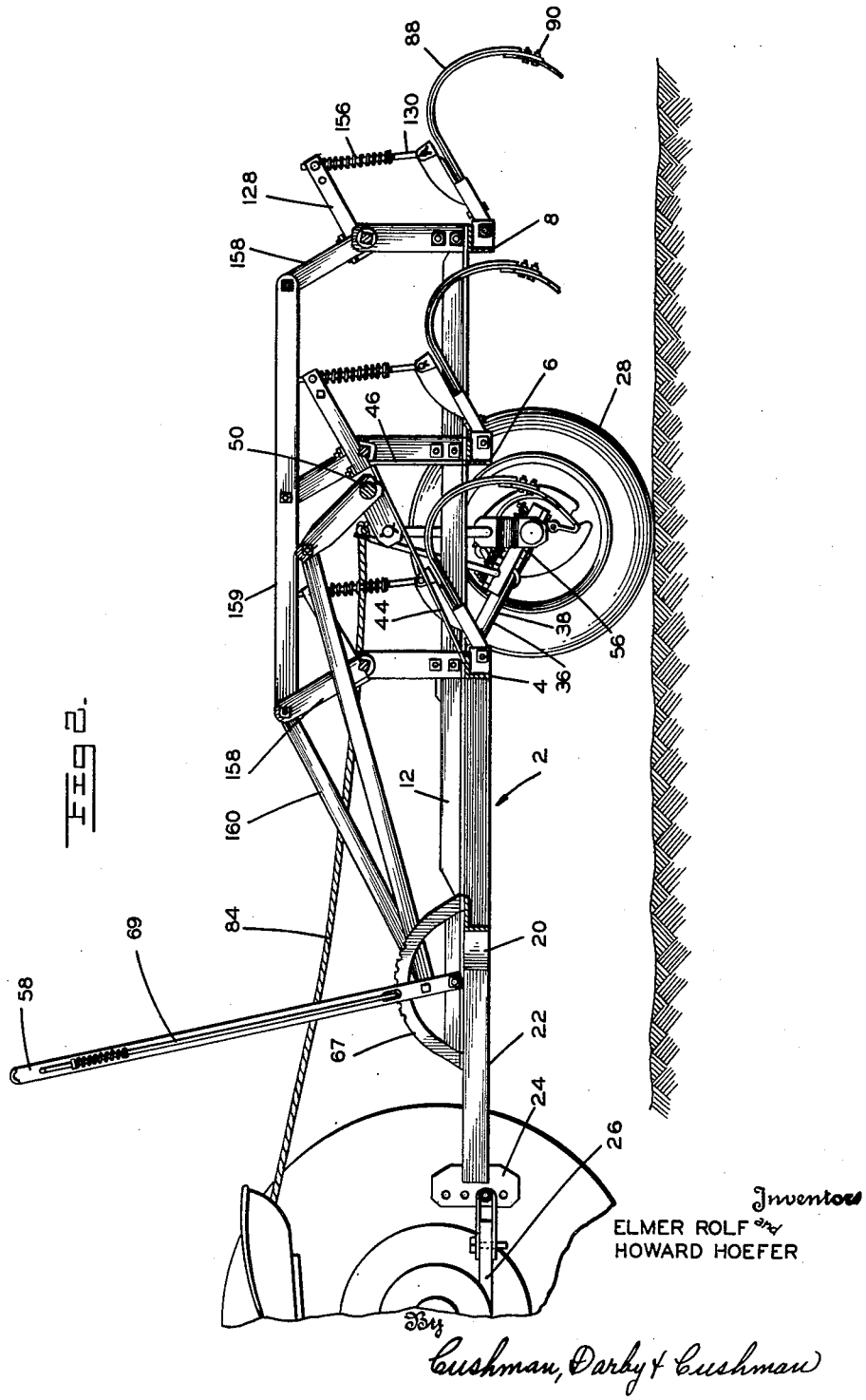

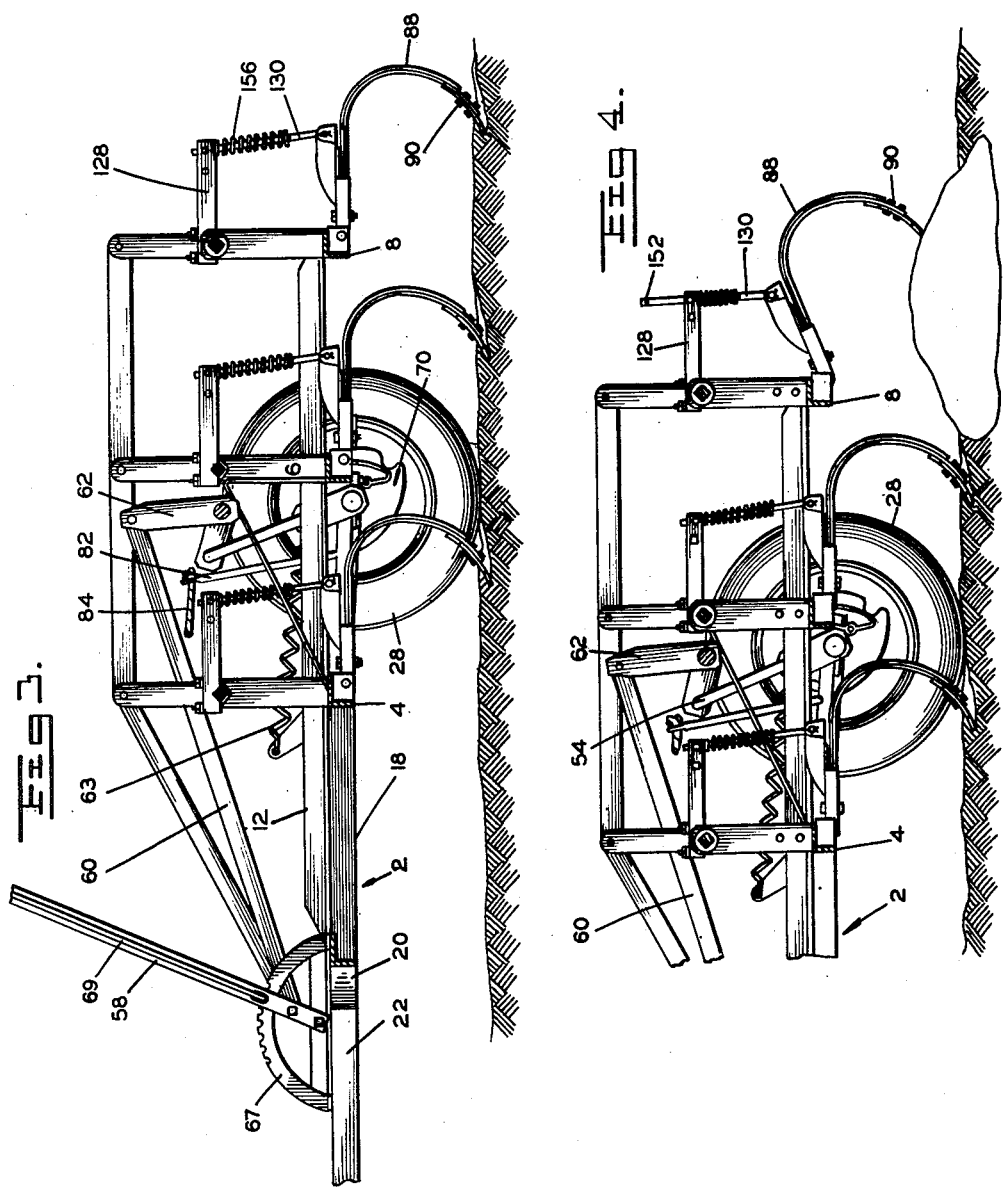

INVENTORS
ELMER ROLF and
HOWARD HOEFER
BY
Cushman, Darby & Cushman
ATTORNEYS

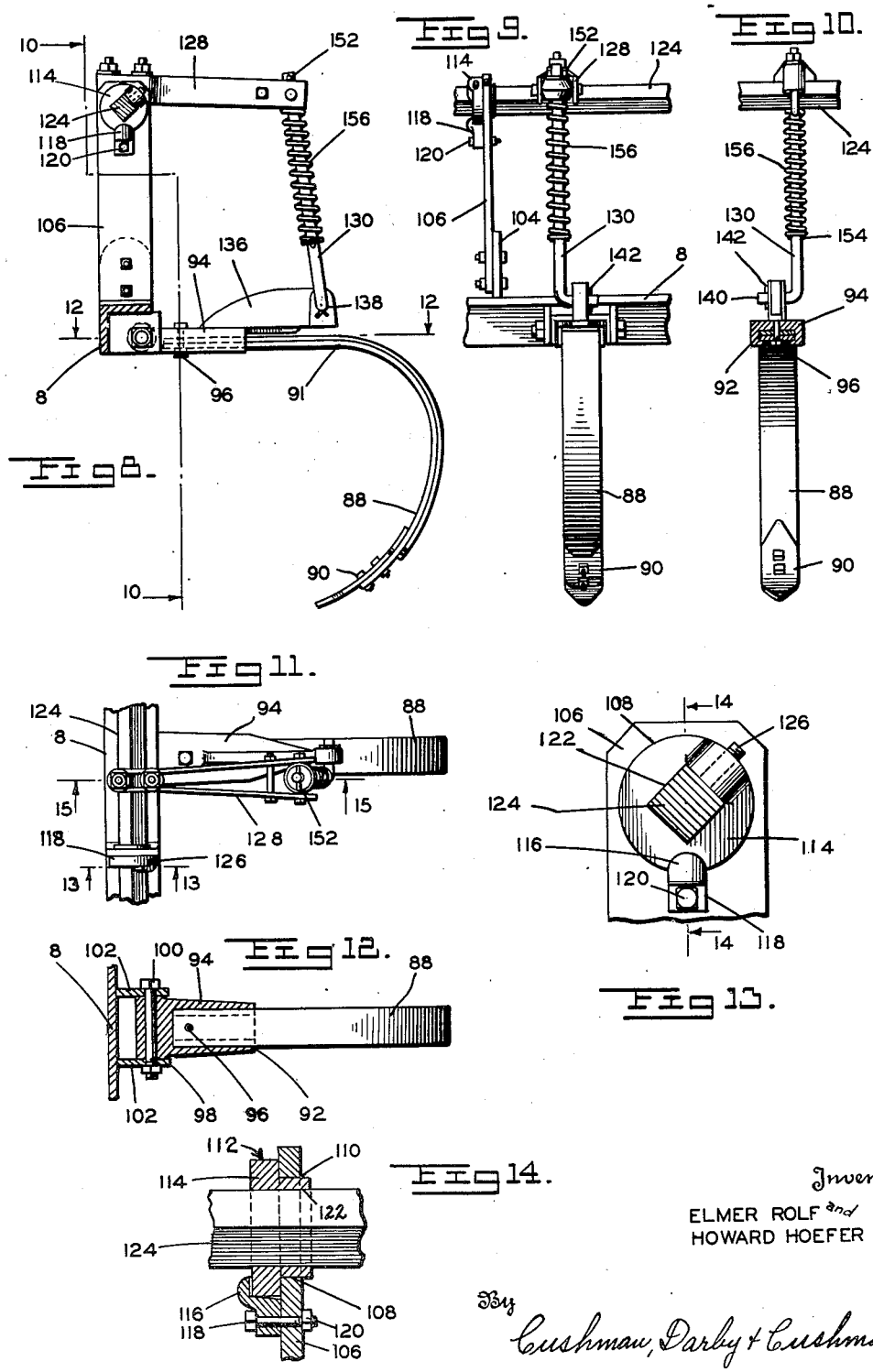

Patented June 1, 1954

2,679,793

UNITED STATES PATENT OFFICE 2,679,793

FIELD CULTIVATOR

Elmer Rolf and Howard Hoefer, Glencoe, Minn.

Application November 4, 1949, Serial No. 125,488

1 Claim. (Cl. 97—165)

The present invention relates to field cultivators and is particularly concerned with a field cultivator which is especially adapted for the tillage of rough, littered fields.

Scientific tests indicate that trash covered fields, for example, fields bearing small grain stubble, or other crop residue, on the soil surface, absorb a considerable amount of moisture and, if such fields are utilized for crop production in summer-dry areas, greatly increased production can be obtained. However, most of the cultivators now in use are not particularly suitable for working rough fields and, consequently, even tillage of the soil is extremely difficult to attain and cultivating speeds are relatively slow. Accordingly, the principal object of this invention is to provide a cultivator which is especially adapted for such use and makes possible the even tillage of such fields at markedly increased cultivating speeds.

More specifically, it is an object of this invention to provide a field cultivator having, in combination with means for controlling the depth of the cultivator elements in the soil, or for raising the same clear of the ground, means for adjusting the pitch of the cultivating elements from spring tooth position to digging position thereby permitting pitch adjustment of the cultivating elements at any particular depth, the cultivating elements being mounted upon the cultivator in such a manner as to permit any element which might strike an obstruction to rise up and over the same without affecting the other cultivating elements.

Another object of this invention is to provide a field cultivator as above described having individual clutch mechanism mounted upon the supporting wheels and easily operable from the tractor seat, for raising or lowering either side of the cultivator, or the whole machine, as may be desired.

These and other objects will appear more clear from a study of the accompanying drawings wherein:

Figure 1 is a plan view of the present invention;

Figure 2 is a sectional view taken on the line 2—2 of Figure 1, the cultivating elements being shown raised in an inoperative position;

Figure 3 is a view similar to that of Figure 2 with the cultivating elements lowered into an operative position;

Figure 4 is another view similar to Figure 2 showing the manner in which a cultivating element may ride over an obstruction which may be encountered while cultivating;

Figure 8 is a sectional view of the cultivator taken on the line 8—8 of Figure 1 showing the manner in which the cultivating elements are mounted upon the cultivator;

Figure 9 is a fragmental rear elevation view of that portion of the cultivator which is shown in Figure 8;

Figure 10 is a sectional view of the same taken on the line 10—10 of Figure 8;

Figure 11 is a fragmental plan view of the portion of the cultivator which is shown in Figure 8;

Figure 12 is a sectional view taken on the line 12—12 of Figure 8;

Figure 13 is a sectional view taken on the line 13—13 of Figure 11;

Figure 14 is a sectional view taken on line 14—14 of Figure 13;

Figures 15, 16:
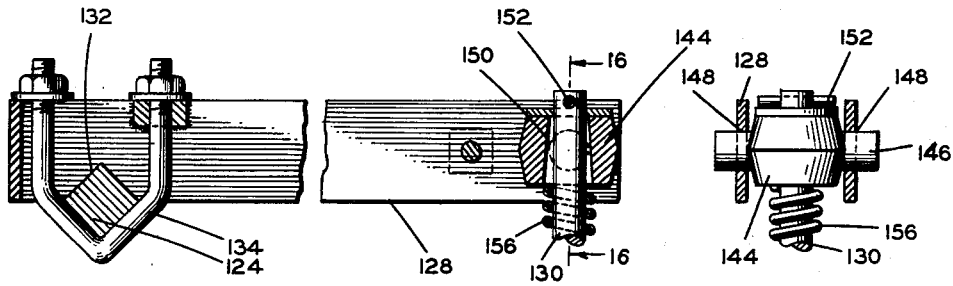
Figure 15 is a sectional view taken on the line 15—15 of Figure 11.
Figure 16 is a sectional view on the line 16—16 of Figure 15.

Referring specifically to Figure 1, the cultivator includes a frame, indicated generally by the numeral 2, constructed of suitable angle iron members which are firmly joined together to provide a husky construction that is capable of withstanding the rough and careless treatment which such equipment is frequently subjected to.

More specifically, the frame 2 is comprised of three longitudinally spaced, transversely extending frame members, the front member being designated as 4, the middle member as 6 and the rear member as 8. The members 4, 6 and 8 are joined by a pair of spaced longitudinally extending bracing members 10 and 12 and a pair of angularly disposed bracing members 14 and 16, the foremost ends of the members 10, 12, 14 and 16 extending beyond the front member 4 to various points of connection on a pair of bracing members 18 and 20 which are joined to the opposite ends of the front member 4 and converge towards one another to brace a hitch 22, the latter being provided with an adjustable hitch plate 24 for the usual connection with a drawbar 26 of a tractor.

The frame 2 is supported by means of oppositely disposed wheels 28, each of which is rotatably mounted upon a separate axle 30, the latter being supported within, and extending inwardly beyond, a sleeve 32 provided in a casing member 34. A wheel hanger 36 is connected to each of the members 34, each hanger comprising a rearwardly extending portion 38, the end of which is connected to the casing 34, and a transversely extending portion 40 by means of which the hanger is pivotally secured to the frame, the latter being accomplished by the provision of brackets 42 on the front frame member 4, adjacent the ends thereof.

For adjusting the depth of the cultivating elements, several strut members 44 are fixed to the front frame member 4 and extend upwardly and rearwardly therefrom to a point directly above the middle frame member 6, the same being supported by vertical braces 46 which are provided on the frame member 6. Each of the struts 44 is provided adjacent its rear end with a bracket 48 having an opening therethrough within which a transverse shaft 50 which extends substantially the width of the cultivator is pivotally supported. The shaft 50 is provided at each end with a crank arm 52, each of the crank arms 52 being connected by means of a link 54 with another crank arm 56 which, in turn, is keyed to the end of wheel axle 30 which extends inwardly beyond the sleeve 32.

As is quite obvious from the above, when the shaft 50 is turned, or pivoted about its axis, the cultivator wheels will be raised or lowered, thus permitting the depth of the cultivating elements in the soil to be varied or raised clear of the ground, and in order that the raising or lowering of the frame may be accomplished from the tractor seat, an upstanding hand lever 58 is pivotally secured to hitch 22, and connected with shaft 50 by means of a lever arm 60 which, in turn, is pivotally connected with a connecting arm 62 keyed to the shaft 50. In addition to the above, coil springs 63 are provided on both sides of the cultivator between the hangers 36 and the brace members 14 and 16 to assist in the raising or lowering of the wheels, these elements being connected to the brace members by any suitable means 64 and to the hangers by means of the arms 65 which are keyed thereon.

As shown in Figures 2 and 3, the cultivating elements are raised by pulling forwardly upon hand lever 58 and lowered by pushing rearwardly thereupon. In order to maintain the hand lever 58 in a position which gives the desired depth of the elements, a rectangular frame 66 provided with a pair of upstanding quadrant shaped racks 67 and 68 is mounted upon hitch 22, the hand lever 58 being provided with a pawl and lever mechanism 69 which cooperates with the rack 67 to lock the lever 58 in the desired position.

Figures 5, 6:
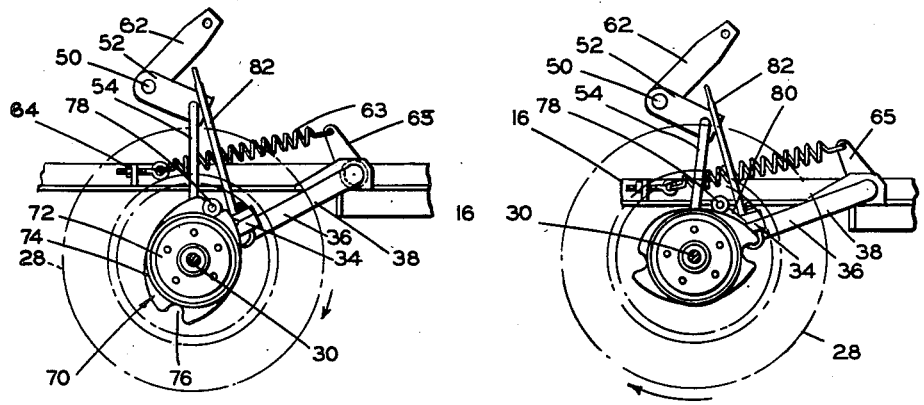
Figures 5, 6 and 7 are fragmental side elevation views of the cultivator showing the clutch mechanism which is employed for raising or lowering either side of the cultivator in different positions, the wheel to which the same is connected being removed for clarity.
Figure 7:
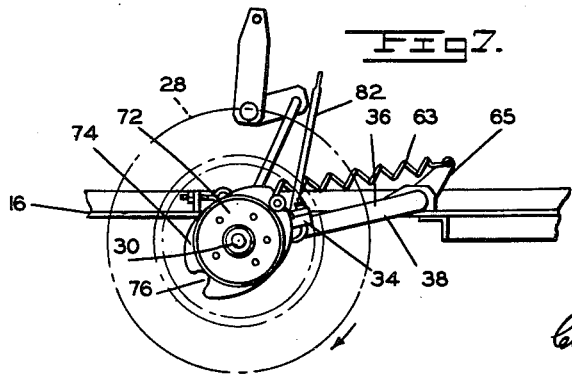

As mentioned above, the supporting wheels are provided with individual clutch mechanisms for raising or lowering either side of the cultivator, or the whole machine, as may be desired. With particular reference to Figs. 5 to 7 it is to be noted that the clutch mechanism, broadly indicated by the numeral 70, is of the usual half-turn type. Specifically, the clutch 70 includes a driving member 72 which is mounted upon axle 30 and constantly rotates thereupon with the wheel 28, and a driven member 74 which is keyed to axle 30 and is adapted to be intermittently rotated by driving member 72 through suitable interlocking means too well known in the art to warrant the detailed discussion thereof. The member 74 is provided with a pair of oppositely disposed depressions 76 and, normally, a roller 78 carried by an arm 80 of an operating lever 82, the latter being pivotally mounted on casing member 34 (see Figure 1), is positioned within one of these depressions 76 (see Figure 5), the interlocking means being thereby rendered inoperative to prevent rotation of driven member 74.

By the above arrangement, if it should be necessary to raise or lower either side of the cultivator, the corresponding lever 82 is pulled forwardly by means of a pull rope 84 (Figure 1), which is easily operable from the tractor seat, thus withdrawing roller 78 from the depression 76 within which it is seated (Figure 6), thereby permitting driven member 74 to be rotated by the driving member 72 until the roller 78 encounters the other depression 76 (Figure 7), the rotation of member 74 causing crank arm 56 to pivot about its connection with link 54 to effectively raise or lower the side of the cultivator by raising or lowering the wheel.

The transversely extending frame members 4, 6 and 8 are provided with a plurality of cultivating elements 86, the same being mounted upon the frame members in a manner which permits the adjustment of their pitch at any depth from spring tooth to digging positions and, in addition, permits each element to function independently of the others so that a tooth which strikes an obstruction while the cultivator is in operation, will readily ride over the same, as shown in Figure 4, without affecting the other teeth.

Referring to Figures 8 to 16, each element 86 is comprised of a spring steel tooth 88 which is provided at its lowermost end with a cultivating shoe or shovel 90, such, for example, as the spear point or duck foot types.

The upper end of the tooth 88 is provided with a horizontally disposed portion 91 which extends into a slot 92 provided in a clamping member 94, the tooth 86 being held therein by means of a pin 96. The innermost end of clamp member 94 is provided with a transverse opening 98, the clamp member 96 being pivotally secured, or hinged, to a frame member, shown in the drawings as being the rear frame member 8 although it should be understood that the cultivating elements are similarly mounted on the frame members 4 and 6, by the passage therethrough of a bolt 100, the latter being supported adjacent its ends by a pair of vertical webs or plates 102 which are welded to the legs forming the frame member.

Fixed by brackets 104 to the frame member are a number of spaced, vertical standards 106, each of these standards being provided adjacents its upper end with a circular opening 108 adapted to receive a correspondingly shaped portion 110 of a collar 112. The collar 112 is free to turn with respect to the standard 106, but the lateral displacement thereof is prevented by the provision of a shoulder 114 thereon, the movement of the collar to the right (in Figures 13 and 14) being prevented due to the abutment of shoulder 114 against standard 106 while movement to the left (in Figures 13 and 14) is prevented by engagement of the shoulder with an upraised portion 116 of a guide member 118 which is secured to the standard by any suitable means 120.

The collars 112 are provided with a square opening 122 therethrough, adapted to receive a transverse rock shaft 124 which extends substantially the length of the frame member, the shaft 124 being keyed to the collars 112 by means of pins 126.

Each of the cultivating elements 86 is connected to the rock shaft 124 by means of a rearwardly extending yoke 128 and a lifting link 130. As shown in Figure 15, the yoke 128 is provided with a notched portion 132 which conforms with the surface of rock shaft 124 and the yoke is secured thereto by means of a U-bolt 134.

The lifting link 130 is connected to the cultivator element 86 through the provision of a ribbed portion 136 on clamping member 94, rib 136 having a transverse opening 138 at the outer end thereof to receive a horizontally disposed portion 140 of link 130, a cotter pin 142 being fixed to the outermost end of link 130 to prevent the accidental displacement thereof from the clamping member.

Lifting link 130 and yoke 128 are connected by means of a collar 144, see Figures 15 and 16, the latter being supported on the yoke 128, adjacent the outer end thereof, by the provision thereon of a pair of oppositely disposed lugs 146 which extend outwardly through transverse openings 148 provided in the yoke. The lifting link 130 extends upwardly through a tapered opening 150 provided in the collar 144, same being vertically movable with respect to the collar to permit the cultivator element to rise upwardly should it encounter any obstruction during the cultivating operation.

The lifting link 130 is provided with a stop pin 152 adjacent its upper end and a second pin 154 positioned beneath the collar 144, a compression spring 156 being supported about the link 130 between the last-named and the undersurface of the collar 144 to normally maintain stop pin 152 against the collar 144.

With the above arrangement, the pitch of the cultivating elements is readily adjustable from, for example, spring tooth position to digging position by rocking the shaft 124, the outer end of yoke member 128 being raised or lowered thereby to either lift upwardly against the pin 152 or push downwardly against coil spring 156, thereby varying the pitch of the cultivating elements. In order that this pitch adjustment may be made from the tractor seat, the rock shafts 124 are connected by means of links 158, connecting arm 159 and lever arm 160 to another pivotally mounted hand lever 162, the latter being provided, as in the case of the depth adjusting hand lever, with suitable pawl and lever mechanism (not shown) for cooperation with rack 68 for locking the lever in any desired position. In addition, it will be noted that the cultivator elements are independently spring mounted upon the frame in such a manner as to permit any element which may strike an obstruction to rise up and over the same and then, through the action of spring 156, snap back into place without affecting any of the other cultivating elements.

By the provision, as above described, of depth adjusting means and pitch adjusting means in the cultivator it is apparent that the pitch of the cultivator elements may be adjusted from a spring tooth position to digging position at any particular depth, and, in addition, by mounting the cultivator elements in the manner shown, each cultivating element operates as a separate unit entirely independently of the others, the unique combination thus obtained providing a cultivator which is especially adapted for working rough, littered fields.

Having thus described our invention, what we intend to claim as new is:

A cultivator having a wheeled frame comprising spaced longitudinal parallel frame members, a hitch bar disposed therebetween and extending forwardly thereof, a forward transverse member secured to said longitudinal frame members rearwardly of the forward end thereof and to the rear end of said hitch bar, diagonal brace members connected at one end to the ends of the forward transverse member and at their other end in V-relation to the hitch bar, corresponding intermediate portions of said diagonal brace members being connected to the forward end of said longitudinal frame members, a plurality of longitudinally spaced transverse members secured to said longitudinal frame members, the rearmost transverse member being secured to the rear ends of said longitudinal frame members, said transverse members progressively increasing in length from the forward transverse member to the rearward transverse member, diagonal brace bars disposed one on each side of the longitudinal frame members connected to the transverse members and to the diagonal brace members, transversely spaced ground working elements pivotally mounted on each of said transverse members, and adjustable pitch controlling means for regulating the operating angle of the ground working elements of said transverse members comprising supporting bars fixed to each of said transverse members and extending upwardly therefrom, rock shafts extending transversely of said frame and rotatably supported by said supporting bars above each of said transverse members, the ground working elements of said transverse members being connected to the adjacent rock shaft whereby rotation of said shaft adjusts the pitch of said elements, a longitudinally movable connecting bar extending lengthwise of said frame above said rock shafts, connecting arms rigidly fixed to each of said rock shafts and pivotally connected to said connecting bar, whereby longitudinal movement of said connecting bar effects rotation of said shafts, and adjustable means at the apex of said wheeled frame associated with said connecting bar for longitudinally moving the latter, the connection of said rock shaft to each of said elements comprising a yoke fixed to said rock shaft and extending rearwardly therefrom, a spring pressed connecting link secured to each said ground working element and extending upwardly therefrom for connection with its associated yoke, the link being vertically movable with respect to said yoke thereby permitting said ground working element to rise over any obstruction which may be encountered without affecting the remaining elements, a rearwardly extending crank axle pivotally mounted at each end of the forward transverse member, each carrying a wheel at the free end thereof and including means for raising and lowering the frame to effect depth adjustment of the ground working elements, the ground working elements being arranged on said transverse members in staggered relation with respect to each other, the outermost ground working element at each end of the rearmost transverse member being arranged thereon in longitudinal alignment with the wheel at the corresponding side of the frame.

References Cited in the file of this patent

UNITED STATES PATENTS

| Number | Name | Date |
|--------|------|------|
| 349,972 | Baker | Sept. 28, 1886 |
| 989,725 | Rodgers | Apr. 18, 1911 |
| 1,219,880 | Strode | Mar. 20, 1917 |
| 1,621,993 | Mills | Mar. 22, 1927 |
| 1,886,229 | Robinson | Nov. 1, 1932 |
| 2,260,174 | Elliott | Oct. 21, 1941 |
| 2,352,589 | Scarlett et al. | June 27, 1944 |
| 2,355,519 | Dunham | Aug. 8, 1944 |
| 2,385,950 | Silver | Oct. 2, 1945 |